United States Patent [19]
Witriol et al.

[11] 3,961,272
[45] June 1, 1976

[54] ENCODING ALTIMETER

[76] Inventors: Norman M. Witriol, 2501 Lancelot Drive SE, Huntsville, Ala. 35803; Carlton L. Frederick, 518 Dryden Road, Ithaca, N.Y. 14850

[22] Filed: Dec. 17, 1974

[21] Appl. No.: 533,576

[52] U.S. Cl. .............................. 328/129; 328/44; 328/48; 73/179
[51] Int. Cl.² ................. G01R 29/02; G01C 21/00
[58] Field of Search ..................... 328/44, 129, 48; 307/222; 73/179, 6

[56] References Cited
UNITED STATES PATENTS

| | | | |
|---|---|---|---|
| 3,500,022 | 3/1970 | Toscano | 307/222 R |
| 3,868,845 | 3/1975 | Shimizu | 73/6 |

*Primary Examiner*—Donald O. Woodiel
*Attorney, Agent, or Firm*—Nathan Edelberg; Robert P. Gibson; Robert C. Sims

[57] ABSTRACT

The pressure of the atmosphere is sensed by a pressure transducer which causes a resistance to vary. The variance of this resistor is converted to a variable frequency. The number of cycles of this frequency in a set amount of time is counted by a counter and displayed by a digital display. An up/down counter is loaded with the count of the last digital readout in the previous cycle and counts down the number of cycles in the frequency of the next reading and displays the difference on a digital display or activates a sonic output if the countdown is greater than the stored previous count.

3 Claims, 5 Drawing Figures

ENCODING ALTIMETER

BACKGROUND OF THE INVENTION

The field of the invention is related to altimeters and vertical velocity altimeters. Current altimeters use an aneroid barometer which mechanically moves three hands around a circular dial to diplay altitude. Current encoding altimeters use this type display together with various expensive means of converting this information to the code necessary for input to the aircraft transponder for transmission to a ground facility. Current ordinary vertical velocity indicators use an aneroid barometer with a pinhole in the static system to provide information on the rate of altitude change. This information is displayed to the pilot by a mechanically moving hand rotating around a circular dial. Current instantaneous vertical velocity indicators function in a similar manner except that they have a mechanical system which compensates for the delay time in the ordinary vertical velocity indicator. The ordinary vertical velocity indicator's cost is comparable with that of an altimeter, and the instantaneous vertical velocity indicator is roughly three times the cost of the ordinary variety. The current encoding altimeter cost is about 10 times the cost of an altimeter. General devices to warn pilots of an approaching preset altitude are nonexistent due to the fact that they would have to be self-contained and thus be very expensive. Specific devices to warn of minimum altitudes do exist and are exceedingly expensive.

It is noted that many instruments in the panel of the prior art are of the dial variety and due to the large number of these dials situated around the cockpit, assimilation and interpretation of information by the pilot is difficult and time consuming.

SUMMARY OF THE INVENTION

A pressure transducer made up of a barometer with a movable plate controls the amount of light falling on a photocell by a light emitting diode. The resistance of this photocell is measured and converted gate, a variable frequency in accordance with the amount of resistance. A clock activates a flip flop which in turn activates an AND gate to which the variable frequency is also connected. The output of the AND gate is fed to a counter. After a predetermined time the flip flop and the AND gates are turned off, and the count on the counter is displayed by a digital display to indicate the altitude. This count is also sent to and stored in an up/down counter. The clock will once again reset the flip flop, which in turn resets the AND gaate, and the counter will once again start to count the number of cycles in the variable frequency over the counting period of time. The output of the AND gate is also connected to an up/down counter which will count down the amount stored therein during the next period of time. The value of the up/down counter is fed to a digital display. If the value of the up/down counter goes to zero, the circuitry will cause the up/down counter to count up and inactivate a minus sign display. A predetermined altitude value may be fed into another up/down counter by a digital switch. If the countdown does not go below zero the up/down counter will activate a son-alert.

DESCRIPTION OF THE PREFERRED EMBODIMENT

Figure 1:
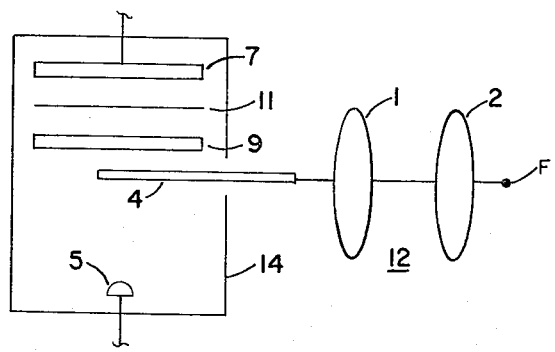
FIG. 1 is a diagrammatic showing of a pressure transducer of the present invention.

FIG. 1 shows a pressure transducer having aneroid elements 1 and 2 of a barometer 12. Aneroid element 2 is fixed at point F and element 1 is movable in reponse to changing pressure. Element 1 is attached to a moving plate 4 so as to cause the plate to move in or out of the optical line of sight from the light emitting diode 5 to the photocell 7. In this way the plate 4 controls the amount of light which falls on the ground glass diffuser 9 and in turn the amount of light and the location thereof which passes through mask 11 to the photocell 7. The effects due to aging of the photocell could be avoided by referencing to a second photocell which has the same aging characteristics but is not shadowed by the moving plate.

The mask 11 is a plate with a slit of some predetermined shape in it. The slit shape can compensate for an nonlinearities in the photocell's response. The slit also could be shaped in such a way that the device would read the log of the amplitude (or any other function) of the pressure sensed by the barometer 12.

The light emitting diode 5 is connected to a regulated voltage source not shown. photocell 7 responds to the change of light intensity with a change of resistance. The photocell 7 is connected in the circuit of the digital altimeter shown in FIG. 2. A housing 14 incloses elements 4–11.

Although a specific altimeter structure is shown in FIG. 1, other altimeter devices may be used such as a barometer which directly connects to vary a potentiometer to change its resistance. Another technique would be to connect the aneroid barometer to a capacitor plate. The varying altitude would cause a varying capacitance and then in FIG. 2 instead of using a resistance to frequency chip 16, one would use a capacitance to frequency circuit. An additional similar technique would be to connect the aneroid barometer to an inductance slug. The varying altitude would cause a varying inductance and then in FIG. 2 instead of a resistance to frequency chip 16, one would use an inductance to frequency circuit. As is well known, the height of an airship is inversely proportional to atmosphere pressure.

Figure 3:
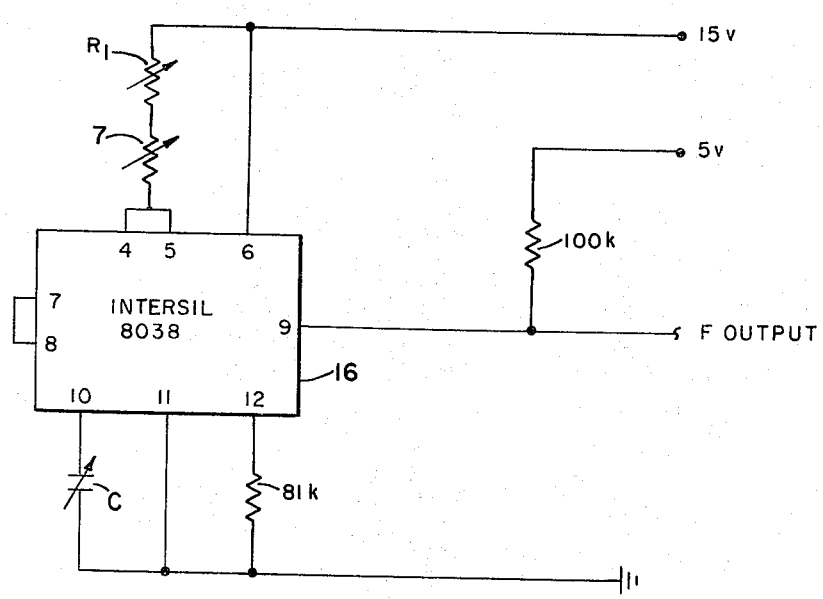
FIG. 3 is a schematic showing of a voltage control oscillator.

FIG. 3 shows that the resistance of the photocell 7 is connected in a circuit to a "resistance to frequency chip" 16. This block 16 may be any of the well known voltage control oscillators such as the Intersil 8038 chip. A 15 volts dc supply is connected through variable resistor R1 and 7 to the input of the voltage control oscillator 16 so as to control its output frequency in accordance with the value of the resistors Rl and 7. Resistor Rl is a barometer trim resistor used to calibrate the barometer with respect to atmospheric conditions. Capacitor C is an instrument scale adjustor. The resistor 7 is the photocell of FIG. 1; however, resistor 7 could be any resistor which is controlled by a barometer device.

Figure 2:
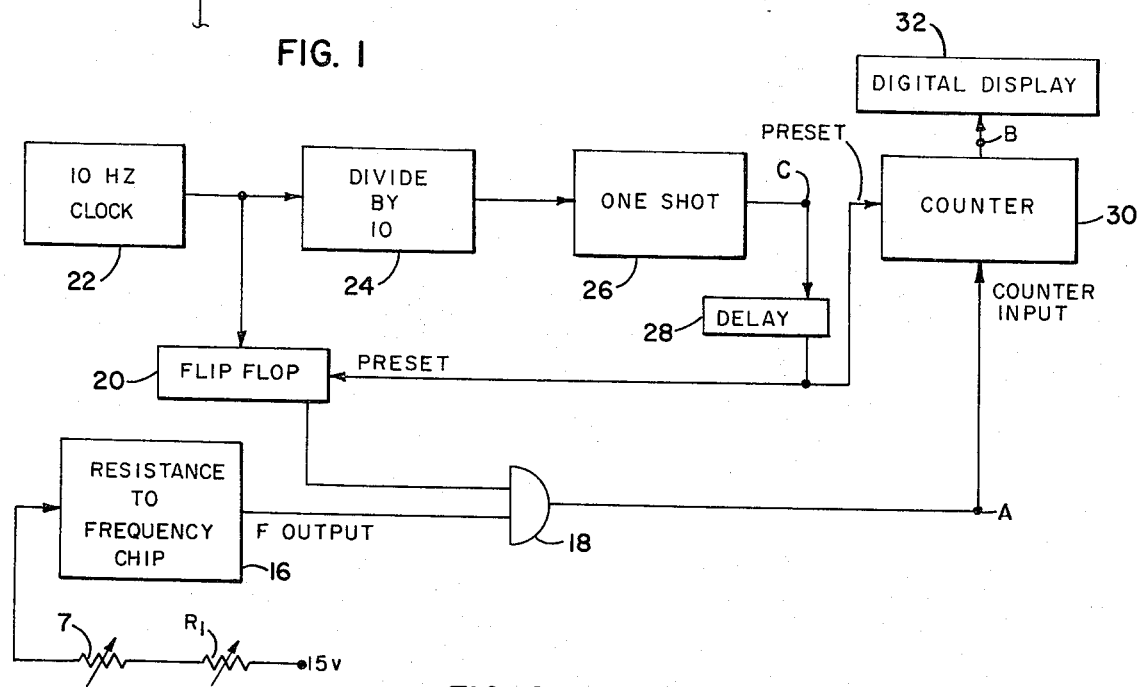
FIG. 2 is a block diagram illustrating a portion of a digital altimeter.

In FIG. 2 it can be seen that the output of the resistance to frequency chip 16 is fed to one input of an AND gate 18. The other input of the AND gate 18 is connected to an output of a flip flop 20. The set input of flip flop 20 is connected to an output of a 10 Hz clock 22. when the flip flop is in a preset condition, the output of the flip flop is positive, therefore, enabling AND gate 18. A divide by ten circuit 24, a one shot multivibrator 26 and a delay device 28 are connected in series between the output of the clock and the preset of flip flop 20. Any of the well known divide by ten circuits, one shot circuits and delay devices may be used. The one shot 26 is also connected through a delay 28 to a reset input of a three decade counter 30. The counter is programmed to reset to a minus altitude in order to provide an altitude offset capability through resistor R. In the present case, we programmed it to reset to 900 (which is equivalent to −100 ) instead of to 000. Any of the well known counters and digital displays 32 may be used.

In the operation of FIG. 2 the analog input, which is the amount of resistance of 7, causes a frequency to be generated by chip 16 which is proportional to the resistance of photocell 7. The frequency is counted for one clock cycle of clock 22 by counter 30 (minus the small delay caused by delay device 28). If the vertical velocity indicator function of FIG. 4 is not to be used, then delay device 28 could be eliminated.

The frequency output of voltage control oscillator 16 causes the AND gate 18 to go on and off in accordance to the valve of the frequency. This will in effect produce pulses to the input of a three decade counter 30. These pulses are counted until clock 22 causes flip flop 20 to go into its set condition. The output of flip flop 20 then goes to "0" (or minus) and disenables AND gate 18. This stops the count of counter 30. The count is displayed digitally by a digital display 32 which in effect is a display of the frequency of block 16. Digital display 32 displaces the count for nine cycles of clock 22 plus the time of delay 28, after which time the one shot 26 resets counter 30, presets a flip flop 20, and the process cycles over again.

The amount of time delay caused by delay 28 is small when compared to one clock cycle. It is less than one hundredth of a clock cycle. Delay 28 prevents the resetting of counter 30 until its count is fed into the up/down counter 40 of FIG. 4. The Hz output of chip 16 can be calibrated so that the number read on digital display 32 is equal to the airship's height in feet (or in meters, inches, etc.).

Figure 4:
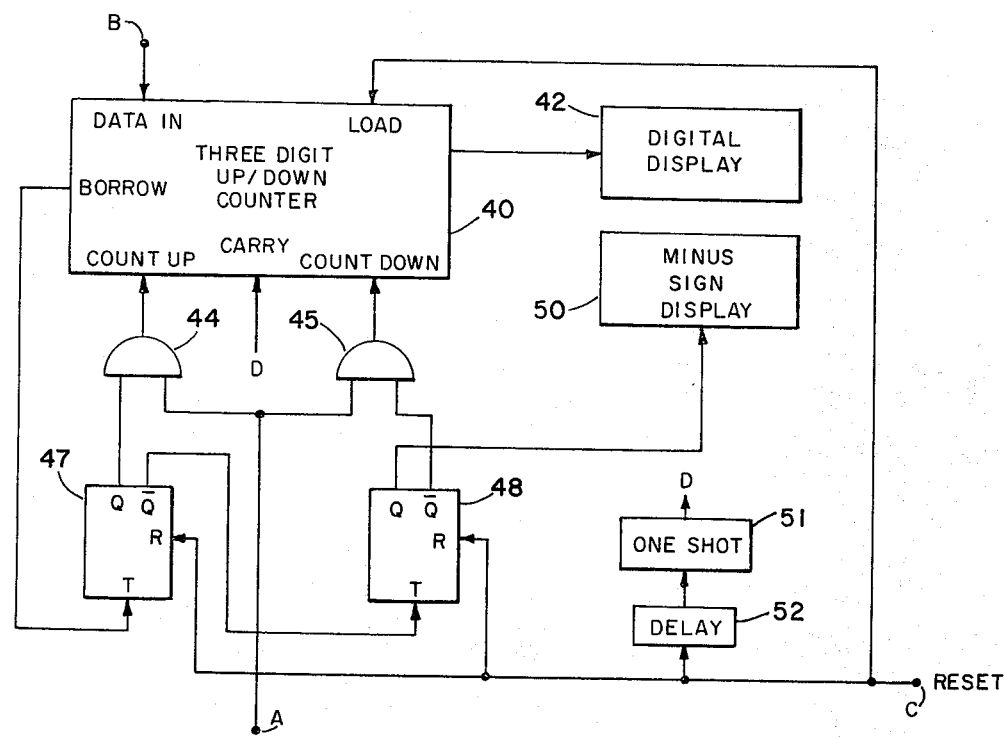
FIG. 4 is a block diagram of the vertical velocity indicator.

FIG. 4 shows the vertical velocity indicator which is to be connected to the circuit of FIG. 2 at points A, B and C as indicated on the drawings of FIGS. 2 and 4. An up/down counter 40 may be three connected SN74192 chips or any of the well known up/down counters in the art. More (or less) than three chips can be connected together in order to provide a larger (or smaller) number of digits in the output. The digital output is displayed by a digital display 42.

The frequency input to be measured and compared is fed in at point A to one of the inputs of AND gates 44 and 45. These AND gates are enabled by flip flops 47 and 48. The flip flops 47 and 48 are connected to AND gates 44 and 45 such that when the flip flops are in the reset condition, AND gate 45 is enabled, and when the flip flops are in the triggered condition, AND gate 44 is enabled. Also when the flip flop 48 is in the triggered position, the minus signal display 50 is disenabled and turned off so as to indicate a rising vertical altitude reading. AND gate 44 is connected to the count up input of counter 40, and AND gate 45 is connected to the count down input of the counter 40. The reset inputs for each flip flop 47 and 48 are connected to point C.

When counter 40 counts down to a zero value, a signal is produced on its borrow output which is fed to trigger flip flop into its triggered condition. The connection of the Q output of flip flop 47 to the trigger input of flip flop 48 causes flip flop 48 to go into its triggered condition.

The number to be counted down is fed into counter 40 from point B when a reset signal is fed to the counter's load input from point C. This number comes from counter 30 of FIG. 2 and is fed into counter 40's memory. A one shot 51 having its input connected to delay 52 and to "100" carry D of counter 40, adds 100 to counter 40 after a delay (shorter than delay of delay 28). This compensates for the fact that counter 30 resets to 900 rather than 000. If counter 30 is operated to reset to one, then one shot 51 and delay 52 would be eliminated. Delay 52 is made shorter than delay 28 so as to add 100 before previous count is loaded. The delay 52 is long enough to allow resetting of counter 40 first.

The operation of the vertical velocity indicator of FIGS. 2 and 4 starts (properly) when the altimeter has gone through one complete cycle. When the one shot 26 produces an output at point C, the up/down counter 40 is commanded to load. The data contained on counter 30 is loaded into counter 40 by connections from point B. It may be noted that this loading process is only possible by the use of a delay circuit 28. If delay 28 was not there then the output of one shot 26 would reset counter 30 before counter 40 would be able to store the data. The amount of delay caused by delay 28 need not be any longer than that time required for the data to be loaded from counter 30 into counter 40. This amount of time compared with a tenth of a second (the time of one clock cycle) is very small. The delay is accounted for by proper calibration of the chip 16.

The altitude from B is now stored in counter 40, flip flops 47 and 48 are reset and the signal from one shot 26 presets flip flop 20 which in turn enables AND gate 18. In the specific case to read a new altitude count. Also, this count is being fed to one input of AND gates 44 and 45. AND gate 44 is not enabled as the Q output of flip flop 47 is "0. " AND gate 45 however is enabled, and the count is fed into the countdown input of counter 40. The countdown process continues until the next clock cycle of clock 22, or until the stored number is counted down to zero. If the stored number is not counted down to zero before AND gate 18 is disenabled, then the readout on digital display 42 indicates a minus vertical velocity. The minus sign 50 will remain lit as flip flop 48 was not put into its triggered condition. However if the stored number in counter 40 is counted down to zero then an output will be produced at the borrow output of counter 40 which triggers flip flop 47. When flip flop 47 is triggered it enables AND gate 44 and triggers flip flop 48. When flip flop 48 is triggered the minus sign display is caused to turn off by any of the well known conventional switching methods. Now the count from A is fed XAND gate 44 to the countup input of counter 40 until the next clock cycle of 22. The readout on the display 42 will not be the increase in altitude of the system over the previous altitude.

In general the vertical velocity indicator indicates on digital display 42 the new flight altitude minus the old flight altitude. The new flight altitude is taken one operating cycle later than the old (original) altitude. If the cycle time is chosen to be one second the reading on digital display 42 will be the vertical velocity per second expressed in the units chosen by the altimeter of FIG. 2. However, to agree with current usage one requires ft/min rather than ft/sec. To convert ft/sec fo ft/min it is necessary to multiply the display value by 60. Call the display value V. We require 60V. One method to obtain 60V is as follows: $60V = 4 \times 10 \times 1.5V$. We obtain each of the multiples by a different method; (i) If we take the cycle time of the system to be 1.5 sec instead of 1 sec, the vertical velocity meter would display ft/1.5 sec. using 1.5 instead of 1 sec we increase the accuracy of the system due to a lengthened integration time of the aneroid. This is the factor of 1.5. (ii) By placing a decimal point before the last digit of the display we effectively multiply the value by 10. This is the facotr of 10. (iii) The factor of 4 is obtained by inserting a three digit BCD/Binary converter as shown in FIG. 4. One then effects a multiply by 4 by inserting a three digit Binary/BCD converter and ignoring the lower two bits in the converter (i.e. connect the lowest output bit from the BCD/Binary converter to the third lowest bit in the Binary/BCD converter, etc.). This is the factor of 4.

Figure 5:
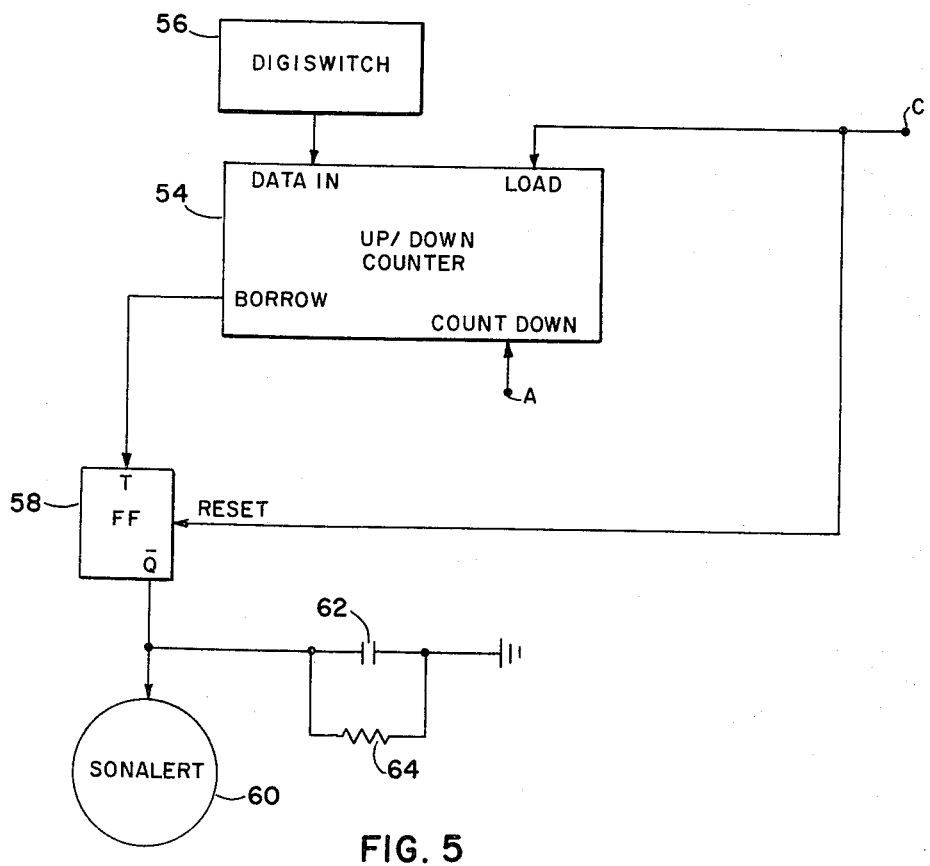
FIG. 5 is a block diagram of a minimal altitude warning unit.

FIG. 5 shows a minimum altitude warning circuit. A further up/down counter 54 is connected to points A and C of FIG. 2 as indicated. Instead of feeding the previous altitude from point B of FIG. 2 to counter 54, the altitude to be counted down is fed in by a digiswitch 56. A numerical value is set on digit switch 56 by the pilot or a computer. The actual numbers on the third digit of the digiswitch are displaced by one from the BCD to take into account counter 30 resetting to 900 (i.e. label 9 = BCD O, label 0 = BCD 1, etc.). This value is fed into counter 54 when the counter is ordered to load by a signal which is connected to the load input of counter 54 at point C. The load signal also resets flip flop 58 producing a voltage output which is connected to a son-alert 60.

A capacitor 62 is connected in parallel with the son-alert and will prevent the son-alert from activating until the capacitor is charged to a predetermined voltage. Charge time of the capacitor is selected such that it is equal to one clock cycle. If the count fed into counter 54 from point A of FIG. 2 has not caused the count to reach zero before one clock cycle, then capacitor 62 will charge up to the predetermined value and son-alert 60 will be activated producing an audible alarm. This alarm will indicate that the airship has dropped below the altitude indicated on digital switch 56. If however the counts from point A count down the value in counter 54 to zero before one clock cycle then the counter will produce an output at its borrow. This output is connected to the trigger of flip flop 58 and will cause flip flop 58 to go into its triggered condition. The output of $\overline{Q}$ is "O" when flip flop 58 is in its triggered condition.

A resistor 64 is connected across capacitor 62 in order to allow the capacitor to discharge. Capacitor 62 and resistor 64 may be omitted. If they are omitted then the son-alert will produce a blip every time the up/- down counter 40 is commanded to load and flip flop 58 is reset. The blip will be of a duration of less than 1/10 of a second as long as the aircraft is above the altitude set on digiswitch 56. This blip will indicate to the pilot that the system is on, and he is above the preset altitude. When the aircraft drops below the altitude set on digital switch 56, the sonalert 60 will produce a continuous tone to indicate the under altitude condition.

We claim:

1. A system comprising a up/down counter having a countup input, a countdown input, a data input, a count output and a borrow output; first information means connected to the data in inputs so as to store a first count in the counter; a second information means producing a second count in a form which said counter can count; a control circuit connecting said second information means to the countdown input; said control circuit being connected to the borrow output so as to switch the connections of the second information means to the countup input when an output is presented by said borrow output; said first and second information means produce outputs in a cyclic manner; reset signal means producing a signal output once each cycle; said up/down counter having a load input; said control means having a reset input; and said reset signal means being connected to the load input of the counter and to the reset input of the control means so as to allow the up/down counter to compare the counts of the first and second information means.

2. A system as set forth in claim 1 further comprising a digital display connected to an output of said counter; a minus sign display associated with the digital display; and said control circuit having an output connected to the minus sign display so as to cause said minus sign display to be in an "on " condition until a signal is sensed from the borrow output, and then said control circuit causing said minus sign display to go to an "off" condition.

3. A system as set forth in claim 2 wherein said control circuit comprises first and second flip flops each having a trigger input, a reset input, and two outputs which represent the true and not true condition of the flip flop; first and second AND gates each having two inputs and an output; said second information means being connected to one of the inputs of each of said AND gates; the true output of the first flip flop being connected to the other input of said first AND gate; the not true input of the said first flip flop being connected to the trigger input of said second flip flop; the borrow output of said counter being connected to the trigger input of said first flip flop; the reset signal means being connected to the reset input of both said first and second flip flops; the not true output of said second flip flop being connected to the other input of said second AND gate; the output of the first AND gate being connected to the countup input of the counter; the output of the second AND gate being connected to the countdown input of said counter; and the true output of the second flip flop being connected to the minus sign display.

* * * * *